(12) United States Patent  (10) Patent No.: US 7,991,245 B2
Putman et al.  (45) Date of Patent: Aug. 2, 2011

(54) INCREASING IMAGE RESOLUTION METHOD EMPLOYING KNOWN BACKGROUND AND SPECIMEN

(76) Inventors: Matthew C. Putman, Brooklyn, NY (US); John B. Putman, Celebration, FL (US)

(*) Notice: Subject to any disclaimer, the term of this patent is extended or adjusted under 35 U.S.C. 154(b) by 263 days.

(21) Appl. No.: 12/474,994

(22) Filed: May 29, 2009

(65) Prior Publication Data
US 2010/0303385 A1  Dec. 2, 2010

(51) Int. Cl.
G06K 9/32 (2006.01)
G06K 9/00 (2006.01)
H01J 3/14 (2006.01)

(52) U.S. Cl. .................. 382/299; 382/128; 250/234
(58) Field of Classification Search .............. 382/299
See application file for complete search history.

(56) References Cited

U.S. PATENT DOCUMENTS

| | | |
|---|---|---|
| 5,251,037 A | 10/1993 | Busenberg |
| 5,376,790 A | 12/1994 | Linker et al. |
| 5,402,171 A | 3/1995 | Tagami et al. |
| 6,147,780 A | 11/2000 | Chiang |
| 6,473,122 B1 | 10/2002 | Kanekal |
| 6,650,704 B1* | 11/2003 | Carlson et al. ........... 375/240.01 |
| 6,812,460 B1 | 11/2004 | Stallcup, II et al. |
| 6,950,469 B2 | 9/2005 | Karczewicz et al. |
| 7,003,143 B1* | 2/2006 | Hewitt et al. ................ 382/128 |
| 7,003,177 B1 | 2/2006 | Mendlovic |
| 7,075,059 B2* | 7/2006 | Oldham et al. .............. 250/234 |
| 7,227,984 B2* | 6/2007 | Cavan ........................... 382/145 |
| 7,768,524 B2 | 8/2010 | Snyder |
| 7,817,834 B2 | 10/2010 | Bernhardt |

(Continued)

FOREIGN PATENT DOCUMENTS
EP  1746816 A  1/2007
(Continued)

OTHER PUBLICATIONS

Vermolen B J et al: "3D restoration with multiple images acquired by a modified conventional microscope." Microscopy Research and Technique Jun. 1, 2004 LNKD-PUBMED:15352082, vol. 64, No. 2, Jun. 1, 2004, pp. 113-125, XP002597491 ISSN: 1059-910X.

(Continued)

*Primary Examiner* — David Zarka
(74) *Attorney, Agent, or Firm* — Renner, Kenner, Greive, Bobak, Taylor & Weber

(57) ABSTRACT

A method for using an image sensor includes steps that permit the calculation of a resolution of the image that is greater than the designed resolution of the image sensor. A specimen is placed onto a known background within the field of view of an image sensor having multiple pixels. The specimen is focused onto the image sensor in a first position relative thereto such that the known background is also focused on the image sensor. An image is recorded for the specimen and the known background focused on the image sensor in the first position, and a specimen region and background pixels are established from the image recorded. The specimen is moved to a second position relative to the image sensor so as to place a portion of the specimen region within a target background pixel. An image is recorded for the specimen and the known background focused on the image sensor in the second position, and the bit depth is calculated for the portion of the specimen region moved into the background pixel.

13 Claims, 8 Drawing Sheets

U.S. PATENT DOCUMENTS

| | | | |
|---|---|---|---|
| 2002/0126732 A1 | 9/2002 | Shakouri | |
| 2004/0113050 A1* | 6/2004 | Olszak et al. | 250/208.1 |
| 2006/0002635 A1* | 1/2006 | Nestares et al. | 382/299 |
| 2006/0133641 A1 | 6/2006 | Shimizu et al. | |
| 2007/0008495 A1* | 1/2007 | Miyagaki et al. | 353/31 |
| 2007/0171284 A1 | 7/2007 | Posamentier | |
| 2009/0028463 A1 | 1/2009 | Putman | |

FOREIGN PATENT DOCUMENTS

WO    00/59206 A    10/2000

OTHER PUBLICATIONS

Ben-Ezre M et al: "Video Super-Resolution Using Controlled Subpixel Detector Shifts" IEEE Transactions on Pattern Analysis and Machine Intelligence, IEEE Service Center, Los Alamitos, CA, US LNKDDOI: 10.1109/TPAMI.2005.129, vol. 27, No. 6, Jun. 1, 2005, pp. 977-987, XP011132801 ISSN: 0162-8828.

Tekalp A M et al: "High Resolution image reconstruction from lower-resolution image sequences and space-varying image restoration" Speech Processing 1. San Francisco, Mar. 23-26, 1992; [Proceedings of the International Conference on Acoustics, Speech and Signal Processing (ICASSP)], New York, IEEE, US, vol. 3, Mar. 23, 1992, pp. 169-172, XP010058997 ISBN: 978-0-7803-0532-8.

Maxfieled, Max, An Alternative (RGBW) Sub-Pixel Technology, Oct. 8, 2006, 4 pgs., http://www.digitaljournalonline.com/news/125/Article/1204/2006-10-08.html.

Borman, Sean; "Super-Resolution from Image Sequences—A Review," 1998 Midwest Symposium on Circuits and Systems, Apr. 5, 1998.

Nikon DXM1200C High-Definition Cooled Color Digital Camera Advertisement and Specifications brochure; Nikon Corporation, Code No. ZCE-MROH-Z, Dec. 2006.

Schultz, R. R.; Stevenson, R. L.; Extraction of High-Resolution Frames from Video Sequences, IEEE Transactions on Image Processing, vol. 5, Issue 6, Jun. 1996, p. 996-1011.

\* cited by examiner

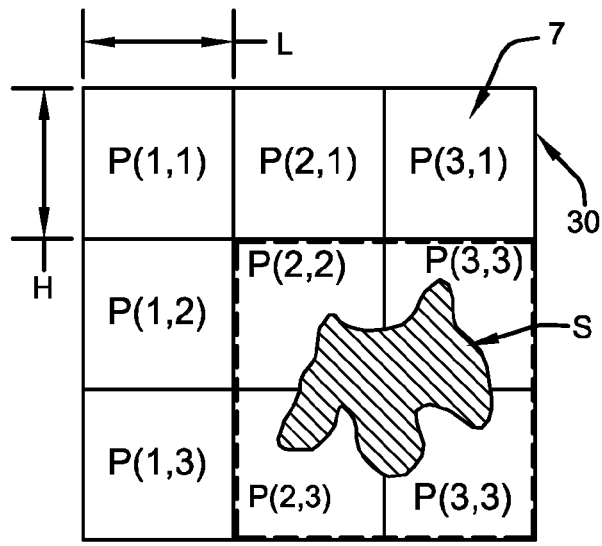
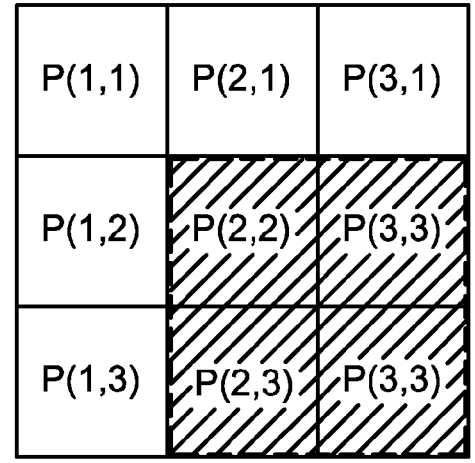
FIG. 5a    FIG. 5b
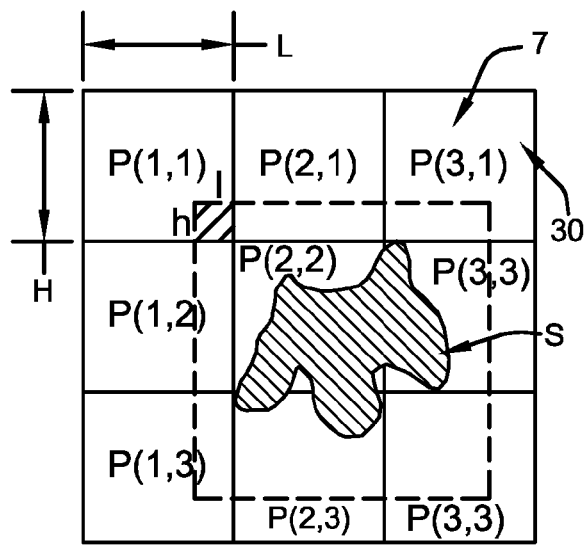
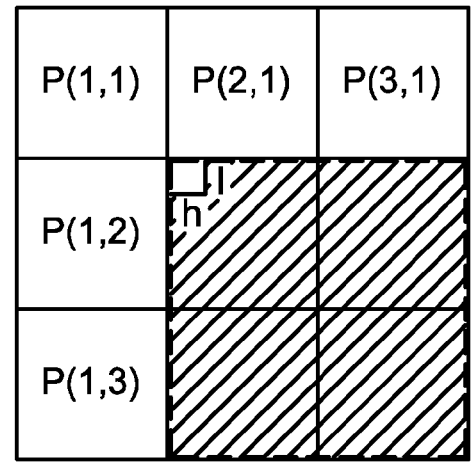
FIG. 5c    FIG. 5d

INCREASING IMAGE RESOLUTION METHOD EMPLOYING KNOWN BACKGROUND AND SPECIMEN

FIELD OF THE INVENTION

The present invention generally relates to digital imaging. More particularly, this invention relates to a method for increasing the resolution that can be achieved with a digital image sensor. In particular, relative movement between a digital image sensor and a specimen set on a known background is employed to permit the calculation and reproduction of an image having a resolution greater than the resolution of the image sensor

BACKGROUND OF THE INVENTION

Digital technology has become the dominate form of imaging for scientific, media and entertainment applications. Charged coupled device (CCD) and complementary metal oxide semiconductor (CMOS) sensors have been available since the 1970's; however due to limitations in pixel size, color depth, and spatial resolution, it has been necessary to employ creative means to improve resolution. Multiple efforts have been made to eliminate noise and to smooth edges. Along with curve fitting algorithms which involve mathematical abstraction, the visualization of an image was improved. Techniques for sub-pixelization were an important step in resolution improvement, especially for common technologies such as high definition television and video.

U.S. Pat. No. 5,251,037, filed in 1992, describes the ability to take advantage of microprocessors in order to process multiple images from a CCD. This method achieved high resolution by controlling exposure while moving a camera with an isolated CCD.

Work described in the paper "High Resolution Image Reconstruction From Lower-Resolution Image Sequences and Space-Varying Image Restoration," published in 1992, by Telkap et al., demonstrates how the frequency of pixel values can be evaluated and noise can be reduced by using a Fourier transform. While this was an important step in the realization of resolution improvement, without the help of higher density CCDs, the interpolation improved images but not overall resolution.

A technical paper entitled "IEEE Transaction on Image Processing, VOL. 5, NO. 6, June 1996" further describes this type of improvement. A process by which pixels are blurred in order to provide a smooth curve, and avoid aliasing, aided digital video in becoming more spatially appealing.

Methods have also been proposed for taking various images, such as the 30 frames per second used in film, and most video, and filling in the unknown area between pixels by employing mathematical means in order to obtain an image which is superior to that defined by the screen, or camera specifications. While this is sometimes called sub-pixelization, it does not directly provide a method by which to observe objects of sizes smaller than one pixel, but instead either extrapolates from trends or overlays known values.

An example of sub-pixelization is described in U.S. Published Patent Applic. No. 2007/0171284 A1. A specimen is focused on an imager, and multiple images are captured, in succession, with the specimen being moved relative to the imager by a distance that is less than the size of a pixel. Whenever a shift in color is observed (that is a change in one of the red, blue or green values) an averaging method is employed to gain a smooth transition between pixels.

Prior art for sub-pixelization has been described through the precise decision of movement direction, which can slice a pixel in a way which allows for edge detection and interpolation to create super resolution images. Through digital treatment techniques such as curve fitting, dithering and simulation, pixel values can be assigned for sub pixels, rather than just the larger pixels of the captured image. An example from patent literature can be seen in publication US 2009/0028464. As with the previous example, the sub-pixelization produces higher resolution images due to an increased gradient.

U.S. Published Patent Applic. No. 2006/0133641 discloses a method for obtaining sub-pixel resolution by evaluating changes in intensity throughout movement. This is similar to the above described patent, but takes in account z direction movement (movement toward or away from the imager). The invention utilizes averaging in three dimensions, in order to create a superior two dimensional final image.

The known high resolution extrapolation techniques are well described by Borman in "Super Resolution for Image Sequences—A Review" in Proceedings of the 1998 Midwest Symposium on Circuits and Systems, 5 Apr. 1998. This in-depth paper described various methods employing various statistical functions to achieve improved final images. Markov chains, and other complex techniques are successfully described, however there is no method provided to either directly track individual sub-pixels or directly solving for sub-pixel values.

In the field of nano-microscopy Putman, U.S. Patent Applic. No. 2009/0028463, describes a method by which sub-pixel locations are defined and mapped through piezo electric nanomovement of a specimen relative to an imager. By moving at known distances smaller than a given pixel, the location of individual sub-pixels can be established and recorded. If a defined location is followed, a statistical function, such as the median, maximum or minimum value, can be taken, and sub-pixel resolution achieved. This method still requires statistical approximations rather than directly solve for a sub-pixel, which the present patent will describe.

All of this is possible, and has been explored in the patent literature because of the ever increasing number of pixels on a sensor, as well as increased processor speeds, allowing for sharper, clearer images on both the micro and macro scale. Piezo-electric translation stages have made it possible to move at distances smaller than a pixel. This innovation makes it possible to continue to sub-pixelate even as pixel size and density increases on CCD and CMOS sensors. Unique algorithms which analyze and reconstruct images make digital still and video photography, through sub-pixelization, more efficient.

A method is needed to provide sub-pixelization and image reconstruction directly and rapidly, without the need for mathematical approximation.

SUMMARY OF THE INVENTION

The present disclosure provides unique image processing techniques that have not been presented in the prior art. A specimen to be imaged is placed on a known background, and incrementally moved within that background to provide a basis for reconstructing the image at sub-pixelated resolution. In this process, linear algebra can be used to reconstruct the image of the specimen, even in those instances where either the specimen or portions thereof to be imaged are smaller than the pixels in a CCD or CMOS camera, whether before or after optical magnification. In this process, the need for curve fitting, dithering, or simulation is eliminated.

A first component of an apparatus useful for carrying out the method is a modern digital image sensor, such as a CCD or CMOS microchip, that will provide the base on which all measurements are to be taken. The image sensors provide a matrix of pixels of known dimensions. Although the size of pixels may decrease as advances are made in image sensor technology, they will necessarily remain larger than the diffraction limit of visible light because anything lower would not be useful in capturing more detailed images. A second key component is a positioning element, such as a piezoelectric nano-positioning stage, that is capable of moving a specimen thereon in distances as small as several nanometers, notably, in some instances, this distance can be less that the diffraction limit of visible light. Thus, in the present invention there is an image sensor with pixels larger than the diffraction limit of visible light, and a positioning element which may move an object relative to the image sensor at distances less than the diffraction limit of light. Based upon the movement described, subpixels can be established and analyzed. These subpixels may each be less than the diffraction limit of light, but can be accorded their own value, bit depth. Using mathematical techniques, values for each subpixel can be generated, and a new image can be calculated, having greater resolution than the designed resolution of the image sensor. Thus, in relevant instances, images may be obtained with significantly improved resolution as compared to the sensor design.

In an embodiment of this invention, a method is provided for using an image sensor to obtain an image of a specimen focused thereon, such that the resolution of the image obtained is greater than the designed resolution of the image sensor. In accordance with this method, a specimen is placed onto a known background within the field of view of an image sensor having multiple pixels. The specimen is focused onto the image sensor in a first position relative thereto such that the known background is also focused on the image sensor. An image is recorded for the specimen and the known background focused on the image sensor in the first position, and specimen region and background pixels are established from the image recorded. The specimen is moved to a second position relative to the image sensor so as to place a portion of an specimen region within a target background pixel. An image is recorded for the specimen and the known background focused on the image sensor in the second position, and the bit depth is calculated for the portion of the specimen region moved into the background pixel.

BRIEF DESCRIPTION OF THE DRAWINGS

FIG. 5a is a representation of a 9 pixel sensor with an exemplary specimen shown positioned to be focused on the sensor so as to overlap portions of pixels P(2,2), P(2,3), P(3,2) and P(3,3), thus establishing a known background at pixels P(1,1), P(2,1), P(3,1), P(1,2) and P(1,3);

FIG. 5b shows how the image of the specimen shown in FIG. 5a would be displayed by the imaging device employing the sensor, and is an example "specimen region;"

FIG. 5c shows movement of the specimen of FIG. 5a relative to a know background so as to place a portion of a specimen region into a background pixel;

FIG. 5d shows how the resolution of the image of the specimen shown in FIG. 5a is improved by moving, imaging and calculating in accordance with this invention;

DETAILED DESCRIPTION OF ILLUSTRATIVE EMBODIMENTS

This invention provides techniques and apparatus to compare multiple digital images of a specimen and thereby increase the resolution of the image beyond the normal resolution provided by the digital image sensor being employed to record the multiple digital images. A specimen to be imaged is isolated in front of a digital image sensor, for example, a charged coupled device (CCD) or complementary metal oxide semiconductor (CMOS), and multiple images are captured. An image may be analyzed in the same manner using a monochrome or color image sensor.

Figure 1:
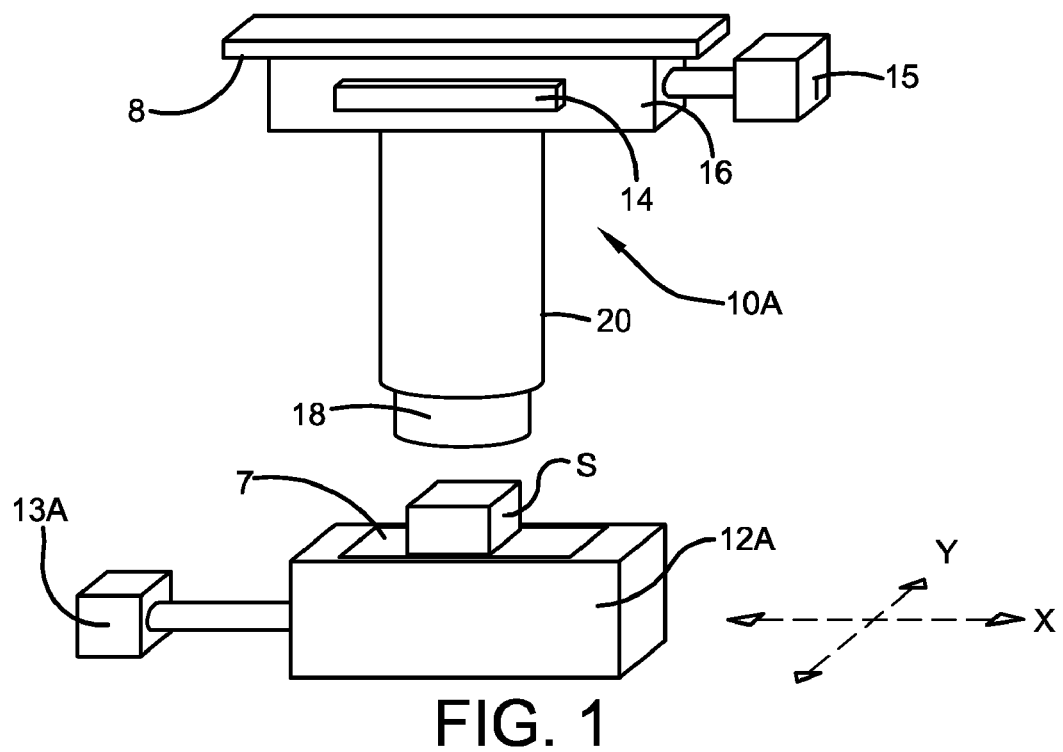
FIG. 1 is a representational view of one embodiment of an apparatus in accordance with this invention, showing a fixed image sensor and a movable specimen.
Figure 2:
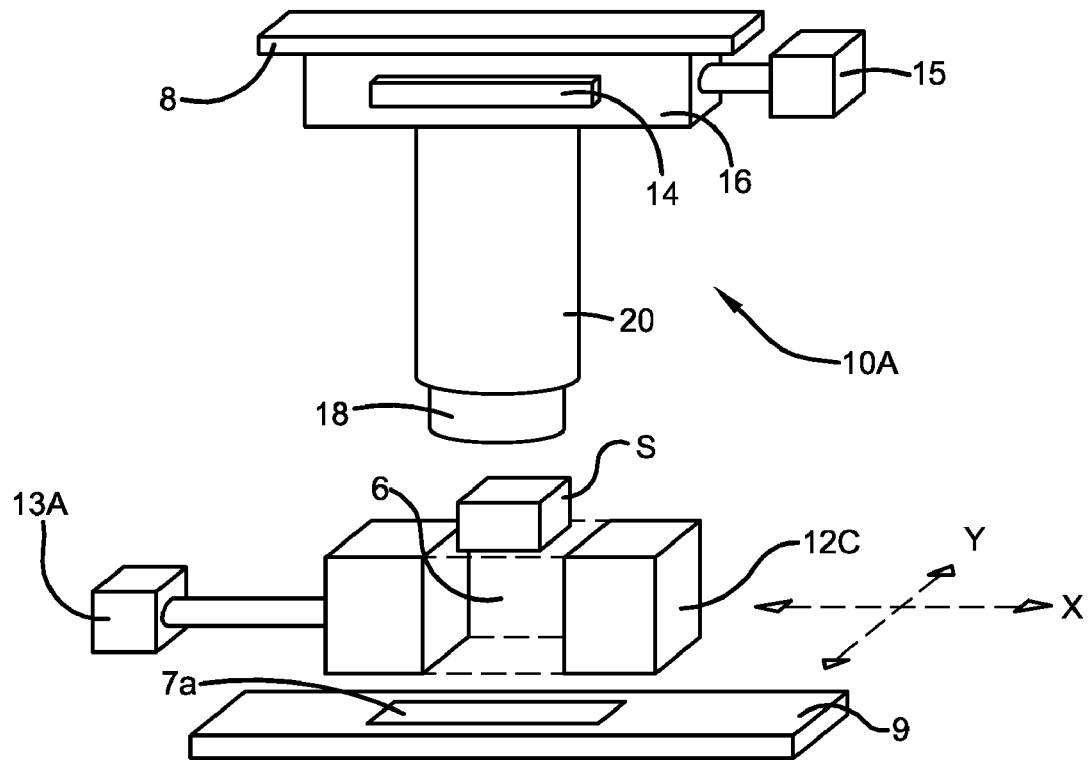
FIG. 2 is a representative view of one embodiment of and apparatus in accordance with this invention, showing a fixed image sensor, a movable specimen place above a fixed background.
Figures 3, 4:
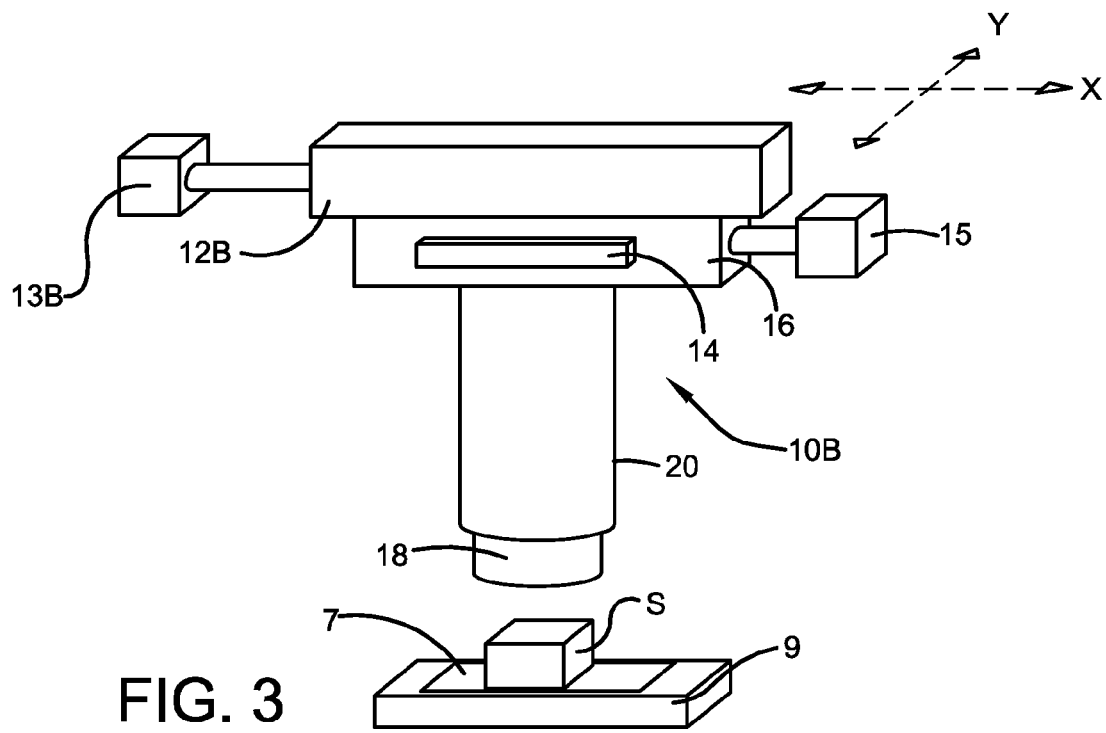
FIG. 3 is a representational view of one embodiment of an apparatus in accordance with this invention, showing a fixed specimen and a movable image sensor.
FIG. 4 is a representation of an image sensor having n pixels in the x direction and i pixels in the y direction.

With reference to FIGS. 1, 2 and 3 a general representation of imaging apparatus that could be employed for the method herein are shown, by way of non-limiting examples, in three embodiments, one in FIG. 1, one in FIG. 2 and the other in FIG. 3. The imaging apparatus of FIGS. 1 and 2 are identified by the numeral 10A and the imaging apparatus of FIG. 3 is identified by the numeral 10B.

In the apparatus of FIG. 1, the specimen to be imaged, herein specimen S, is place on a consistent, known background 7. By "known background" it is meant that the bit depth of the background, as would be recorded by the image sensor 14 (e.g., CCD or CMOS), is known. The imaging apparatus 10A includes a nano-positioner 12A and a nano-positioner controller 13A serving to move the specimen S relative to an image sensor 14 that digitally records the image of the specimen S by means of sensor controller 15. In the apparatus of FIG. 2, the specimen S is place on a clear aperture 6 of a nano-positioner 12C, and the consistent, known background 7 is fixed on a surface 9 relative to the sensor 14. Thus, in the apparatus of FIGS. 1 and 3, the imaging apparatus 10A, particularly the sensor 14, is fixed, and a nano-positioner, such as that at 12A or 12C, and a nano-positioner controller 13A are employed to move the specimen S relative to the fixed image sensor 14 that is to digitally record the image of the specimen S by means of sensor controller 15.

In the apparatus of FIG. 3, an imaging apparatus 10B is employed. In this embodiment, a nano-positioner 12B and a nano-positioner controller 13B are associated with the housing 16 of the imaging apparatus 10B so that the image sensor 14 can be moved relative to a fixed positioning of the specimen S upon the background 7, for example, by being mounted to a non-movable fixed stage 9. Thus, it is desired that a nano-positioner be employed to effect relative movement between the image sensor and the specimen, and it should be appreciated that the nano-positioner could be associated with the image sensor within a camera or otherwise associated with elements of an imaging apparatus to effect relative movement between a specimen and the image sensor.

The image sensor 14 is typically, but not limited to, a CCD or CMOS sensor or the like. The image sensor 14 is retained in a housing 16, and the image of the specimen S is focused onto the image sensor 14 through a lens 18 and lens tube (objective) 20. In the apparatus of FIGS. 1 and 2, the housing 16, image sensor 14, lens 18 and lens tube 20 make up a stationary electronic camera and are mounted in fixed position to a non-movable bracket 8. In the apparatus of FIG. 3, the housing 16, image sensor 14, lens 18 and lens tube 20 make up a movable electronic camera and are mounted to a nano-positioner 12B and a nano-positioner controller 13B. Not shown, but necessary to the capturing of the image is a light source. The application of light is well know to those familiar with microscopy and photography. Light for the invention may be transmitted through the specimen, or reflected incidentally from the specimen.

The nano-positioner, as its name implies, may be programmed and controlled to move the specimen and/or image sensor in parallel planes relative to each other, as represented by the x-y coordinate arrows in FIGS. 1-3. The movement can be as small as nanometers (or smaller if the appropriate technology is available). As will be seen, the magnitude of relative movement is preferably less than the size of a pixel or the equivalent binned pixel of the image sensor. Binned pixels and the binning of pixels are well known in the art.

In accordance with this invention, an image is digitally recorded at a first position, then relative movement is effected between the imaging sensor and specimen, and a new image is taken at the new position. By controlling the movement and comparing the pixel value (bit depth) for each image, information can be obtained to improve the resolution of the image beyond what can be achieved by the image sensor itself.

The optics must provide that the background 7 and the specimen S are within the field of view. Preferably a multitude of images are taken at a multitude of positions. The relative movement is parallel to the plane of the image sensor (i.e., the specimen is not brought closer to or moved further away from the image sensor but remains in focus), and is chosen to place a portion of a "specimen region" in a background of known bit depth. The term "specimen region" is to be understood as the region defined by the pixels on which the specimen S is originally focused and which record the specimen image before movement. This will be more fully understood from portions of the disclosure below. When the specimen is so moved, the change in bit depth of the background is attributable to that portion of the specimen region that was moved into the background, and the bit depth of that portion of the specimen region can then be calculated through relatively simple math.

To further explain this concept and the terminology employed, reference is made to FIGS. 4 and 5a through 5d. A typical image sensor is shown in FIG. 4. The sensor is comprised of multiple pixels, which are referenced by coordinates P(n,i) where n is the number of pixels in the x direction (horizontal) and i is the number of pixels in the y direction (vertical). The total number of pixels in the sensor is n multiplied by i. In FIGS. 5a and 5b, a specimen S is focused on an example 9-pixel sensor 30, in which the width of each pixel P(1,1) through P(3,3) is designated by L, and the depth by H. FIG. 5a shows the actual specimen S relative to the sensor 30, while FIG. 5b shows how the specimen S would be resolved by the sensor 30. More particularly, the specimen S is positioned on a known background, which is also focused on the sensor 30, the background being the white area in FIG. 5a, and identified by the number 7 (commensurate with the numbers employed for the background in the apparatus figures). As can be seen in FIG. 5a, the specimen S is so small as to be focused on only four pixels: P(2,2), P(3,2), P(2,3), and P(3,3). Recalling the definition provided above, in this example, these pixels define the "specimen region" inasmuch as it is those pixels that record the presence of the specimen, as opposed to the background. To help in conceptualizing this specimen region and to help in understanding the movement of the specimen, a bold dashed line box is drawn around the specimen region in FIGS. 5a, 5b, 5c and 7. The specimen region is to be distinguished from the remainder of the image focused on the image sensor 30—in this example, the region defined by pixels P(1,1), P(2,1), P(3,1), P(1,2) and P(1,3)—which is the region made up of only the known background 7, herein the "background pixels."

The pixels of the sensor electronically record the light focused thereon, breaking it down to digital data, as known. The digital data will relate to a particular bit depth for each of the pixels, and, in those pixels on which both the background 7 and the specimen S are focused, the bit depth will be a function of not only the portion of the specimen S focused thereon, but also the portion of the background 7 focused thereon. Thus, though the specimen S has a unique amorphous shape, it will be shown merely as a square in the image produced by the sensor 30, as shown in FIG. 5b. This square makes up the specimen region of this example.

In accordance with this invention it is possible to better resolve the image of specimen S by taking images of the specimen S at an initial position, to establish the specimen region and the background pixels; thereafter taking an image of the specimen S after moving the specimen relative to the image sensor 30 such that, in the new position, a portion of the specimen region is positioned in a background pixel; and thereafter comparing the images taken. Particularly, any of the apparatus of FIGS. 1-3 (or any functional equivalent thereof) are used to record an image (bit depth data) of the specimen and thereby establish the specimen region and the background pixels. Then, the apparatus is used to move the specimen S relative to the image sensor 30 so as to focus a portion of the specimen region onto a background pixel. In this example, the original position and image recorded is shown in FIG. 5b. The recorded image is defined by the bit depth values recorded for each of the pixels of the image sensor 30. The movement is shown in FIG. 5c, wherein the specimen has been moved relative to the image sensor 30, to the left (in the x direction) by a distance "l" (lower case el), and upwardly (in the y direction) by a distance "h", where l is less than the pixel width L, and h is less than the pixel height H. This places what was a portion of the specimen region (namely, a portion of the region defined in the original position at P(2,2)) into a background pixel, namely the background pixel P(1,1), the portion moved therein being defined by the rectangle l-h, as appreciated from the bold dashed line box and the borders of P(1,1). An image is taken at this new position for specimen S, and bit depth values are again recoded for each pixel of the image sensor 30.

Because the bit depth of the background is known, any change in the bit depth for pixel P(1,1) between the original image of FIG. 5b and the subsequent image of FIG. 5c is attributable to the portion defined by rectangle l-h. Thus, the bit depth of rectangle l-h can be calculated through the application of algebra. Particularly, the bit depth recorded at Pixel P(1,1), after movement, is designated as V, and $V=\{[(H*L)-(h*l)]*B+(h*l)*S1\}/(H*L)$, wherein B is the bit depth of the known background and S1 is the bit depth of rectangle l-h, i.e., the bit depth of the portion of the specimen region moved into the target background pixel. Solving for S1 yields: S1={V*(H*L)−((H*L)−(h*l))*B}/(H*L). With all bit depths and dimensions known but for the bit depth of the rectangle l-h (S1), the bit depth of rectangle l-h can be calculated. A new image can then be produced wherein the image at the original position is recreated, but with the rectangle l-h being attributed this new value. This initial movement, imaging, and calculating would do little to completely and accurately resolve the specimen S, but the data gained regarding rectangle l-h can be incorporated into subsequent movement, imaging and calculation to eventually resolve the specimen S to a resolution much more refined than permitted by the actual pixel size of the sensor 30. In this particular example, the rectangle l-h is simply background 7, such that, after the movement and calculation, the image of FIG. 5b is further resolved as shown in FIG. 5d, wherein the rectangle l-h has been calculated and determined to be background, and is thus shown white The above should be sufficient for understanding the general concept of this invention, and it will be appreciated that the skilled artisan is not at all limited in the manner in which the specimen might be moved into a known background to further resolve an image beyond the resolution offered by the pixels of an image sensor. For instance, after the initial movement and imaging described in the example above and shown in FIG. 5c, the specimen S could be moved in virtually any direction to place addition portions of the specimen region into the known background pixels and thereafter calculate a value for those portions so moved. However, in a particular embodiment, the specimen S is moved in a known pattern that establishes subpixels smaller than the pixels of the image sensor being used, and, from these movements, the specimen region can be calculated to have a resolution defined by those subpixels. These "subpixels" are a further refinement of the rectangle l-h broadly disclosed above.

Figure 6:
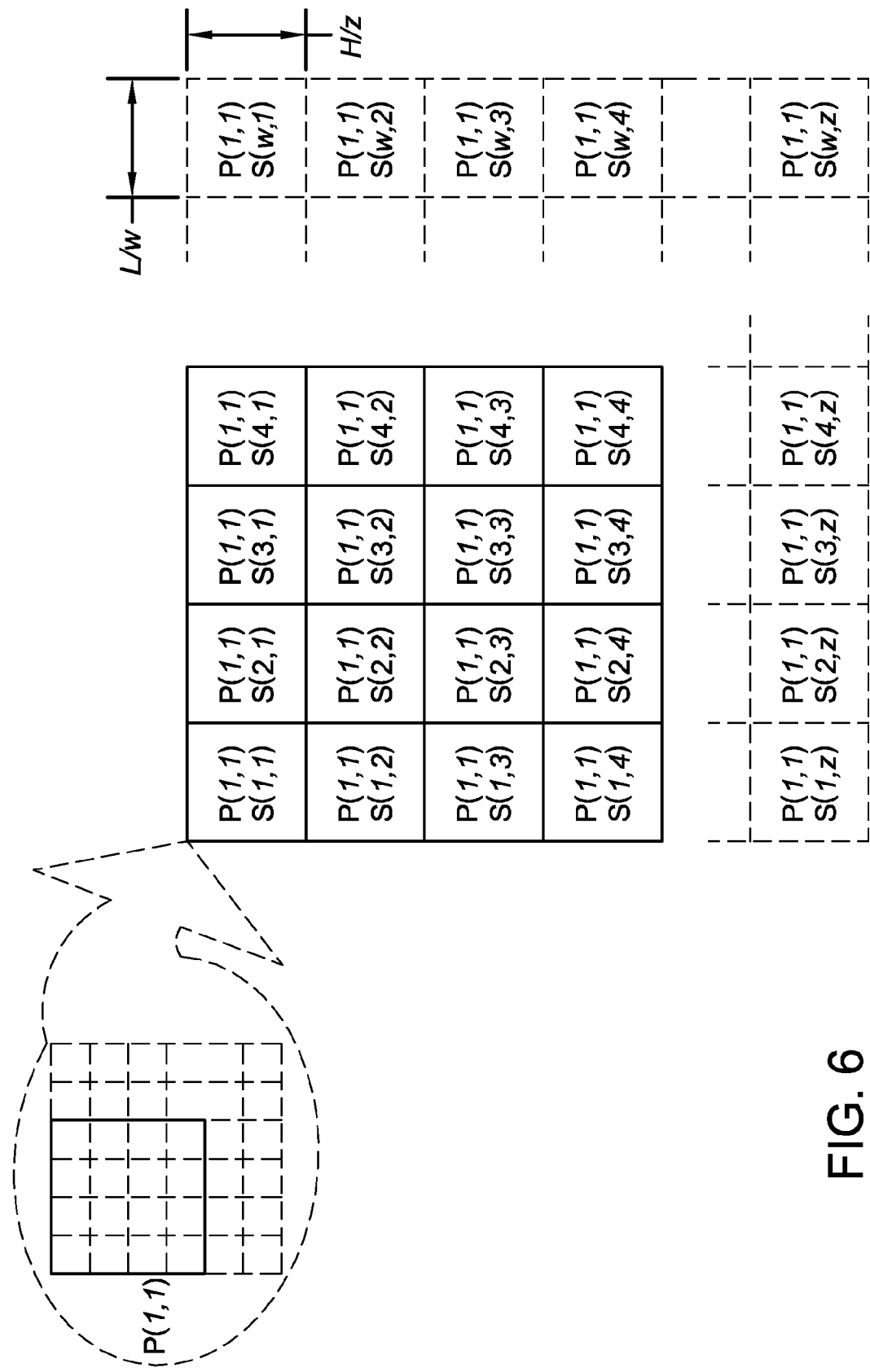
FIG. 6 is an expanded representation of FIG. 4 pixel P(1,1) indicating subpixels contained within.

Thus, although not necessary, in a particular embodiment, the distance of the movement is chosen to establish a pattern of subpixels in accordance with a desired sub-resolution to be calculated and reproduced, as will become more apparent herein below. The division of a pixel P(1,1) (from FIG. 4) into subpixels is shown in FIG. 6, wherein subpixels are referenced by coordinates S(w,z), where w is the number of pixels in the x direction and z is the number of pixels in the y direction. Thus, once established, every subpixel's location on the image sensor array can be specified by the host pixel, P(n,i), in which it resides, and the subpixel location, S(w,z), within that host pixel, such that the subpixels are identified by the following: P(n,i)S(w,z).

To establish sub-pixels of a desired size, a nano-positioner is employed to effect relative movement between the image sensor 30 and the specimen S, whether by being associated with the specimen (e.g., FIGS. 1 and 2), the image sensor or the camera (e.g., FIG. 3). The magnitude of movement in the x and y directions dictates the size of the subpixels established, much as explained above with respect to the rectangle l-h established by moving the specimen S of FIG. 5a to the position of FIG. 5c. The specimen S of FIG. 5a is again the subject of this description, and, thus, the example 9-pixel sensor 30 is again employed, with the width of each pixel P(1,1) through P(3,3) being designated by L, and the depth by H. Broadly, the magnitude of movement is chosen based upon a desired sub-resolution to be calculated and reproduced (i.e., on a desired subpixel size), and preferably is also chosen based upon the size of the multiple pixels that make up the image sensor 30. The specimen S whether placed on or above the known background is moved to a plurality of discrete positions relative to the image sensor to establish subpixels of a smaller size than the multiple pixels of the image sensor. The subpixel dimensions are determined by the magnitude of the stepwise motion. The nano-positioner is programmed to move stepwise in w discrete steps in the x direction and, for each discrete position so established by such x direction movement, is programmed to move z discrete steps in the y direction, where the magnitude of each step is L/w in the x direction and H/z in the y direction. In effect then, a single pixel is divided into w*z subpixels as shown in FIG. 6 and the subpixel dimensions are (L/w) by (H/z).

Figure 7:
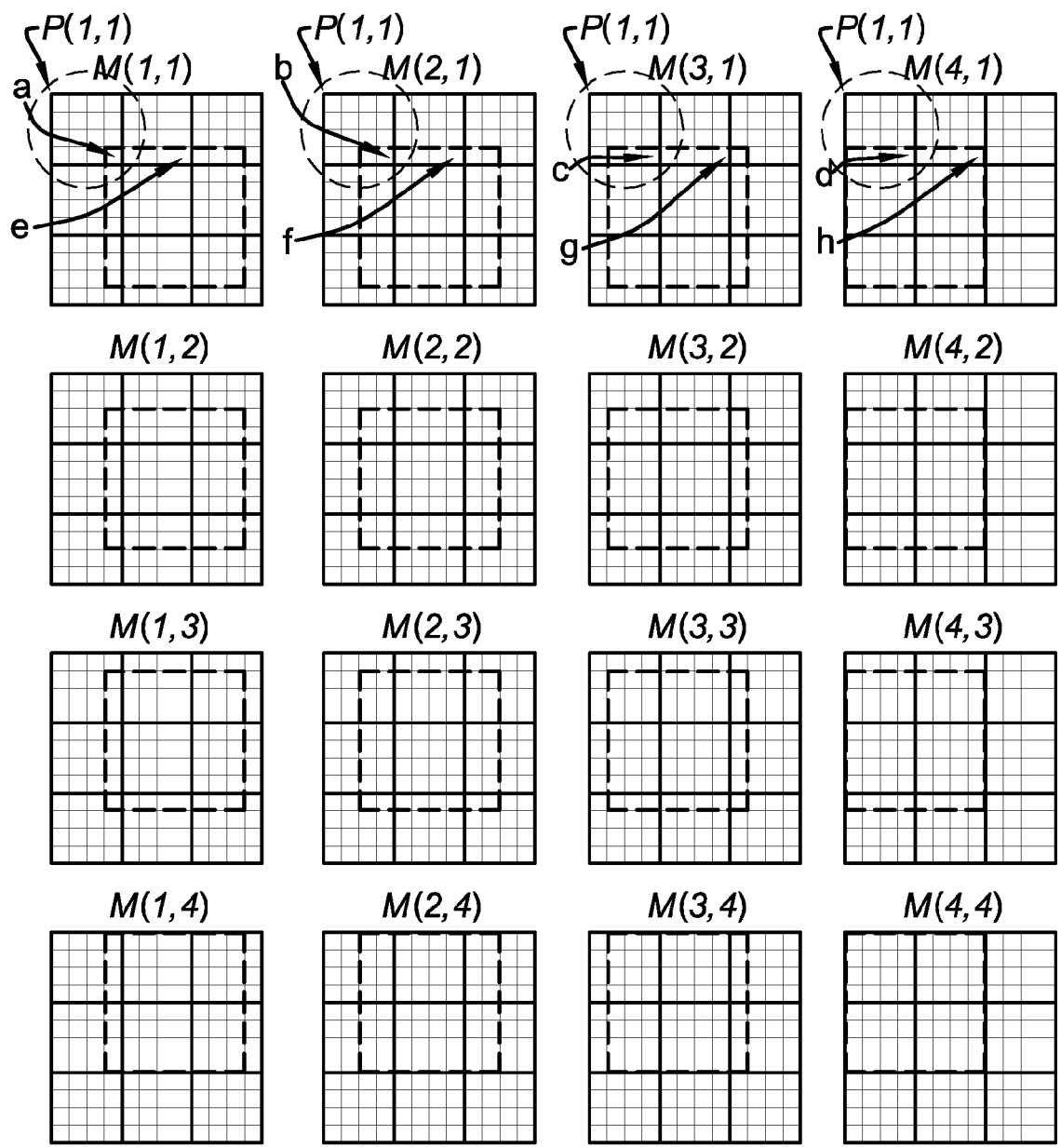
FIG. 7 is a representation of 16 discrete images in which the specimen region is moved incrementally within known background pixels.

In FIG. 7, the specimen S in the position of FIG. 5a is moved so as to establish 16 uniform subpixels within each pixel of the sensor 30. The specimen is not shown in that figure, but should be appreciated to be the same specimen S as in FIG. 5a, establishing the same specimen region and background pixels. The subpixels are established by moving the specimen in four discrete steps to the left and, for each such movement to the left, moving the specimen S four discrete steps upward. Thus, the initial movement at the upper left in FIG. 7 shows movement upwardly at a magnitude of H/z, and leftward at a magnitude of L/w, where both z and w have been chosen to be 4. An image labeled M(1,1) is taken at this position. For ease of reference, each image is provided with an image number abbreviated with the letter M(s,t) where s and t indicate an array position at which the image was taken. From there, the specimen S is most efficiently moved stepwise in an S-like pattern to take multiple images by moving first stepwise to the left, as in images M(2,1), M(3,1) and M(4,1); then upward, as at image M(4,2); then to the right, as in images M(3,2), M(2,2) and M(1,2); then upward again, as at image M(1,3); then to the left, as at images M(2,3), M(3,3) and M(4,3); then upward one final time, as at image M(4,4); and then finally to the left, as at images M(3,4), M(2,4) and M(1,4). Hence 16 stepwise movements are made and images recorded at each discrete position. This establishes a 4×4 subpixelization, with each pixel being broken down into 16 subpixels. If a more refined subpixelization is desired, z and w could be chosen to be 5, such that the specimen S would be moved 25 times, preferably in the S-like pattern described, establishing a 5×5 subpixelization with the pixels of the sensor 30 being broken into 25 subpixels.

In accordance with this embodiment, the specimen S is placed on a known, uniform background or above a known, uniform background so that the specimen is surrounded by the background on at least two adjacent sides of the specimen, with the background being at least 1 pixel in height and 1 pixel in length, preferably more than 1 pixel. In FIG. 5a the specimen resides within the highlighted pixels, P(2,2), P(3,2), P(2,3) and P(3,3), which define the specimen region. The specimen region is bounded by the background pixels, pixels P(1,1), P(2,1), and P(3,1) to the top and P(1,1), P(1,2) and P(1,3) to the left. The specimen S is moved by the nano-positioner up the distance of H/z and to the left the distance of L/w, with z and w both being chosen to be 4, as already noted. This results in the placement of a single subpixel of the specimen region in the background pixel P(1,1). Image M(1, 1) of FIG. 7 shows this resultant movement.

FIG. 7 image M(1,1) shows that a portion "a" of the specimen region has been isolated by movement described above into the background pixel P(1,1). Pixel P(1,1) prior to the movement was recorded only background with known bit depth, BDB (Bit depth background). It can be seen in FIG. 7, image M(1,1), that 15 of the subpixels are background and 1 subpixel defined by portion "a" is unknown. Therefore, the bit depth of portion "a" can be calculated according to the following:

BDP(1,1)=(15(BDB)+1(BDa))/16, wherein BDP(1,1) is the measured bit depth of pixel P(1,1) in image M(1,1), BDB is the known bit depth for the background, and BDa is the bit depth of portion "a" (or subpixel "a"), such that BDa is solved as follows:

BDa=16(BDP(1,1))−15BDB

Once the bit depth of portion "a" has been calculated from image M(1,1), the bit depth of portion "b" of image M(2,1) can be calculated from the bit depth recorded by the pixel P(1,1) in image M(2,1). Particularly, the bit depth for each of the 16 subpixels of pixel P(1,1) contribute to the bit depth recorded by that pixel, and the bit value of 15 of the 16 subpixels are know—14 subpixels of pixel P(1,1) have a known bit depth BDB defined by the known background 7, and 1 subpixel has a known bit depth, BDa, as calculated for portion "a" (now moved over to the left in image M(2,1)). These known values can be used to solve for the bit depth of subpixel "b" in accordance with the following:

BDP(1,1)=(14(BDB)+1(BDa)+1(BDb))/16 wherein BDP(1,1) is the measured bit depth of pixel P(1,1) in image M(2,1), BDB is the known bit depth for the background, BDa is the bit depth of portion "a" calculated as above, and BDb is the bit depth of portion "b", such that BDb is solved as follows:

BDb=16BDP(1,1)−14(BDB)−BDa

Portions "c" through "h" (identified in FIG. 7) can also be calculated through the same general method, which should be readily appreciable without further elaboration. Indeed, all remaining subpixel portions of the specimen region may be iteratively calculated from the movement and representative captured images in accordance with the following:

Sv=nPv−((n−(m+1))B+SUM(Si to Sm))

wherein Sv is the bit value of the unknown subpixel portion of a given image, which is to be calculated; n is the number of subpixels established, m is the number of subpixel portions (e.g., subpixel portions a, b, c etc) that have been determined by previous movements and calculations; B is the bit value of the background, and SUM(S1 to Sm) is the sum of each of the bit values of the know subpixel portions, from the first (e.g., portion "a") to m.

Each unknown subpixel of the specimen region may be calculated successively in the above manner until all subpixels of the specimen region are known. The resultant array of subpixels comprising the entire image sensor represents an image with resolution w*z (w multiplied by z) greater than the original image.

It should be appreciated that the specimen and known background can be placed in the field of view of the image sensor such that the specimen is wholly contained and visible within the known background (i.e., is bounded on all sides by the known background) or the specimen and known background can placed in the field of view of the image sensor such that the specimen is bounded on two adjacent sides by the known background. The latter technique has been shown in the examples above.

It should be appreciated that the movement of the specimen into the known background can be uniform and stepwise so as to establish subpixels of uniform size. As also shown above, the movement can be more random, placing additional portions of the specimen within the known background so as to calculate a bit depth for that portion based on the known bit value of the background and an known bit values for portions of the specimen region previously determined.

Figure 8B:
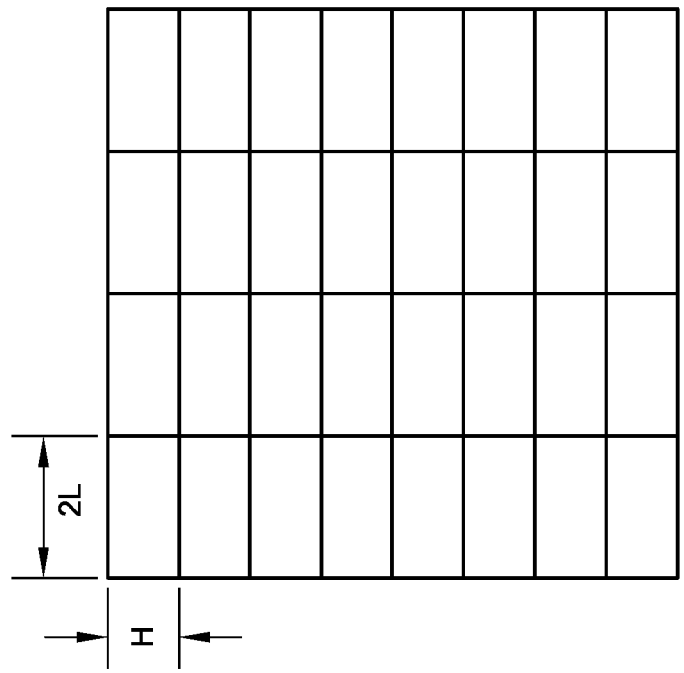
FIGS. 8a and 8b are representations of a sensor with 2×1 pixel binning.
Figure 8A:
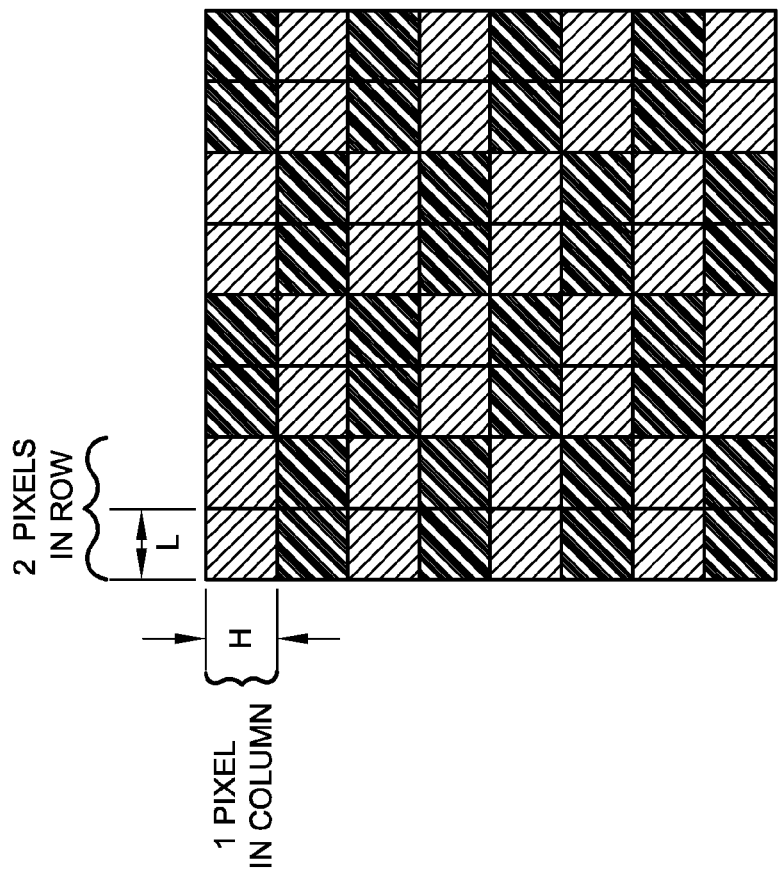
Figure 9B:
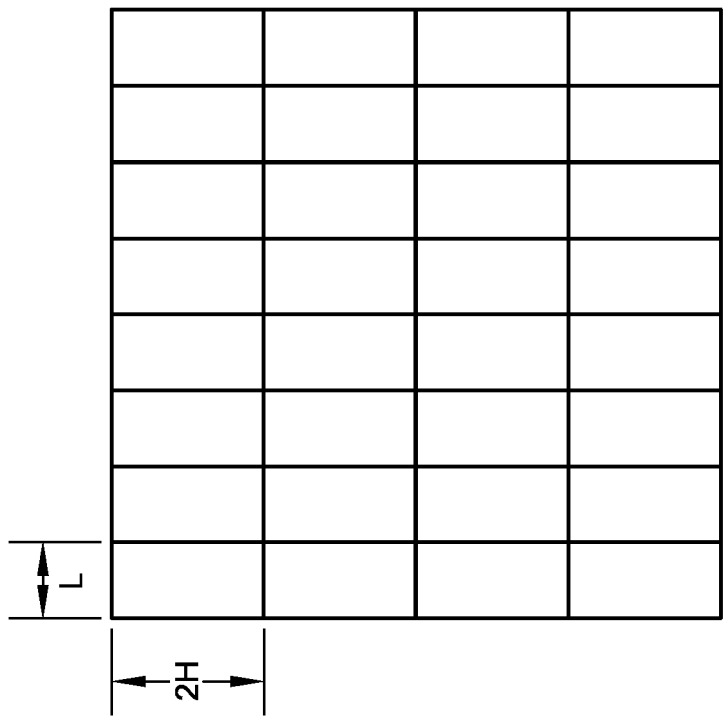
FIGS. 9a and 9b are representations of a sensor with 1×2 pixel binning.
Figure 9A:
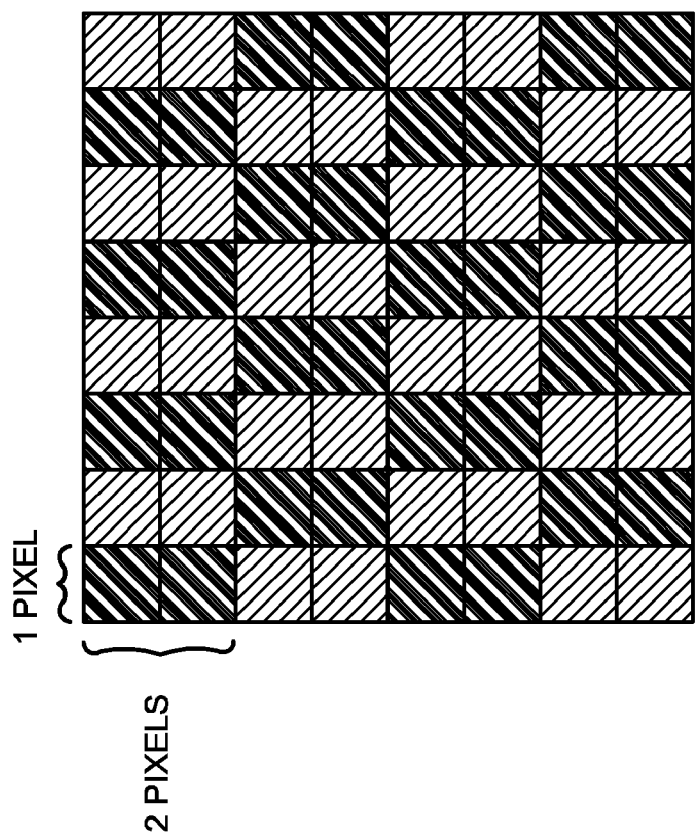
Figure 10B:
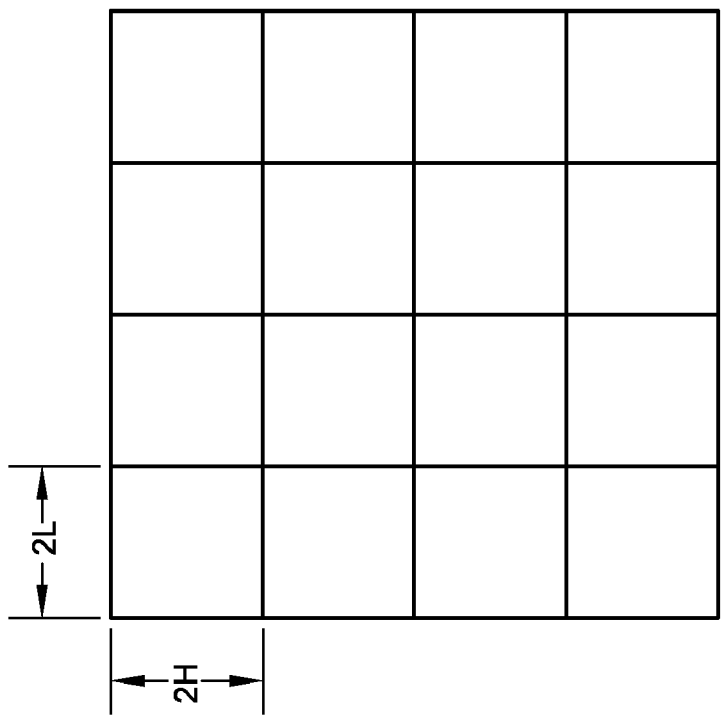
FIGS. 10a and 10b are representations of a sensor with 2×2 pixel binning.
Figure 10A:
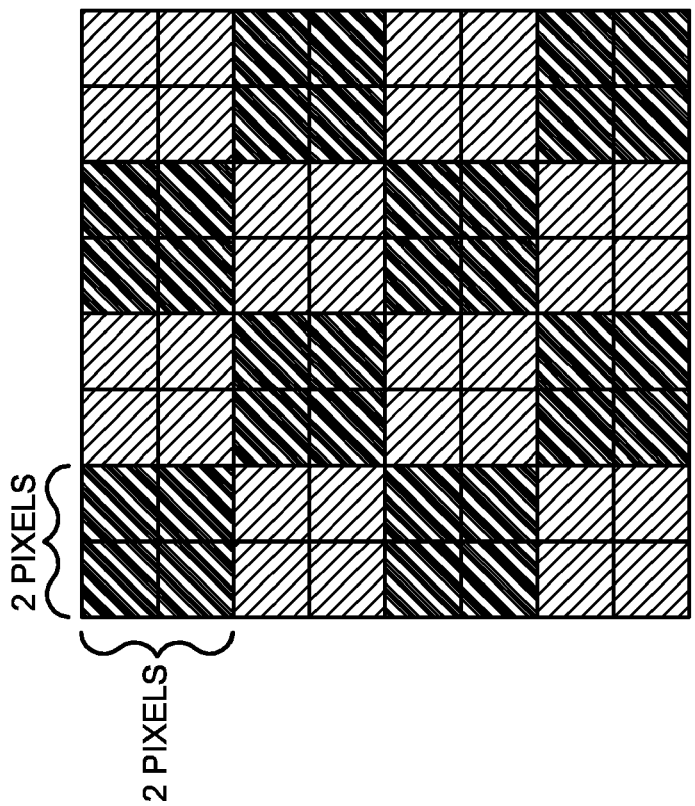

In accordance with another embodiment, the specimen is moved relative to the sensor in steps that result in total movement greater than 1 pixel. In this embodiment, pixels are grouped, also known as "binned," so that multiple pixels may be treated as a single pixel. In binning, 2 or more contiguous pixels are grouped and the pixel value is determined to be the mean of the two or more contiguous pixels. Binning may be used to group pixels in row or in columns or both. FIG. 9a is an example of binning 2 pixels as a row and FIG. 9b is the resultant sensor showing a binned 2×1 pixel of size 2L×H. FIG. 9a is an example of binning 2 pixels as a column and FIG. 9b is the resultant sensor showing a binned 1×2 pixel of size L×2H. FIG. 10a is an example of binning 2 pixels equally in rows and columns and FIG. 10b is the resultant sensor showing a binned 2×2 pixel of size 2L×2H. The resultant sensors of FIGS. 8b, 9b and 10b are treated exactly as the original sensor of FIGS. 5a and 7, with the exception that the dimensions are now changed. A subpixel movement in accordance with the teaching herein is, in these binned embodiments, now based upon the binned pixel size rather than the original pixel size.

In light of the foregoing, it should be appreciated that the present invention significantly advances the art by providing a method for processing images whereby the image can be resolved to a resolution greater than that offered by the imaging sensor employed. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method for using an image sensor to obtain an image of a specimen focused thereon, such that the resolution of the image obtained is greater than the designed resolution of the image sensor, the method comprising the steps of:
    placing a specimen onto a known background of known bit depth values within the field of view of an image sensor having multiple pixels;
    focusing the specimen onto the image sensor in a first position relative thereto such that the known background of known bit depth values is also focused on the image sensor;
    recording an image of the specimen and the known background of known bit depth values focused on the image sensor in the first position and establishing a specimen region and background pixels from the image recorded;
    moving the specimen to a second position relative to the image sensor so as to place a first portion of the specimen region within a target background pixel chosen from said background pixels established in said step of recording;
    recording an image of the specimen and the known background of known bit depth values focused on the image sensor in the second position; and
    calculating the bit depth of the portion of the specimen region moved into the target background pixel in said step of moving the specimen to a second position.

2. The method of claim 1, wherein the target background pixel has dimensions H by L, and, in said step of moving, the first portion of the specimen region moved into the target background pixel has dimensions h by l (el), wherein h is less than H and l is less than L.

3. The method of claim 1, wherein the pixels of the image sensor are binned, and the establishment of the background pixels and the specimen region is based on the binned pixel dimensions.

4. The method of claim 1, wherein, after said step of calculating the bit depth, the method further comprises the step of producing a new image attributing the bit depth calculated in said step of calculating to that portion of the specimen region moved into the target background pixel in said step of moving the specimen to a second position.

5. A method for using an image sensor to obtain an image of a specimen focused thereon, such that the resolution of the image obtained is greater than the designed resolution of the image sensor, the method comprising the steps of:
   placing a specimen onto a known background within the field of view of an image sensor having multiple pixels;
   focusing the specimen onto the image sensor in a first position relative thereto such that the known background is also focused on the image sensor;
   recording an image of the specimen and the known background focused on the image sensor in the first position and establishing a specimen region and background pixels from the image recorded;
   moving the specimen to a second position relative to the image sensor so as to place a first portion of the specimen region within a target background pixel chosen from said background pixels established in said step of recording;
   recording an image of the specimen and the known background focused on the image sensor in the second position; and
   calculating the bit depth of the portion of the specimen region moved into the target background pixel in said step of moving the specimen to a second position wherein the target background pixel has dimensions H by L, and, in said step of moving, the first portion of the specimen region moved into the target background pixel has dimensions h by l (el), wherein h is less than H and l is less than L, and, in said step of calculating, the bit depth of the first portion of the specimen region moved into the target background pixel is denoted as "S1" and is calculated according to the formula: $S1=\{V*(H*L)-((H*L)-(h*l))*B\}/(H*L)$, wherein:
   V is the bit depth of the target background pixel in the image taken in said step of recording an image of the specimen in the second position, and
   B is the bit depth of the known background.

6. The method of claim 5, wherein H/h is an integer and L/l is an integer.

7. A method for using an image sensor to obtain an image of a specimen focused thereon, such that the resolution of the image obtained is greater than the designed resolution of the image sensor, the method comprising the steps of:
   placing a specimen onto a known background within the field of view of an image sensor having multiple pixels;
   focusing the specimen onto the image sensor in a first position relative thereto such that the known background is also focused on the image sensor;
   recording an image of the specimen and the known background focused on the image sensor in the first position and establishing a specimen region and background pixels from the image recorded;
   moving the specimen to a second position relative to the image sensor so as to place a first portion of the specimen region within a target background pixel chosen from said background pixels established in said step of recording;
   recording an image of the specimen and the known background focused on the image sensor in the second position;
   calculating the bit depth of the portion of the specimen region moved into the target background pixel in said step of moving the specimen to a second position;
   moving the specimen to a third position relative to the image sensor so as to place an second portion of the specimen region within a target background pixel, wherein the target background pixel in this step of moving to a third position may be the same as or different from the target background pixel of the prior step of moving to a second position;
   recording an image of the specimen and the known background focused on the image sensor in the third position; and
   calculating the bit depth of the additional portion of the specimen region moved into the target background pixel in the third position.

8. The method of claim 7, wherein said steps of moving, recording and calculating are repeated, with each additional movement step placing a subsequent new portion of the specimen region within a target background pixel, such that a bit depth is calculated for all portions of the specimen region.

9. The method of claim 8, wherein, in said step of placing, the specimen is bounded on two adjacent sides by the known background, and the specimen and adjacent background are in the field of view of the image sensor.

10. The method of claim 9, wherein the target background pixel has dimensions H by L, and, in said steps of moving, the specimen is moved incrementally to place sub-pixel portions of the specimen region into the target background pixel, wherein the sub-pixel portions are defined by dimensions H/z and L/w, with w and z being integers selected based on the desired size of a sub-pixel, and w*z defines the increase in resolution.

11. The method of claim 10, wherein said steps of moving, recording and calculating are repeated, with each additional movement step placing an additional sub-pixel portion of the specimen region within a target background pixel, such that a bit depth is calculated for all portions of the specimen region.

12. The method of claim 10, wherein, in said steps of moving, said specimen is moved z steps in the H direction as defined by the target background pixel and, for each such step, is moved w steps in the L direction defined by the target background pixel, such that there are performed w*z steps of moving, recording and calculating.

13. The method of claim 12, wherein the target background pixel is the same pixel for all steps of moving.

* * * * *